US012047398B2

(12) United States Patent
Juliato et al.

(10) Patent No.: US 12,047,398 B2
(45) Date of Patent: *Jul. 23, 2024

(54) SECURITY REPORTING VIA MESSAGE TAGGING

(71) Applicant: Intel Corporation, Santa Clara, CA (US)

(72) Inventors: Marcio Juliato, Portland, OR (US); Manoj Sastry, Portland, OR (US); Michael Kara-Ivanov, Maale Adumim (IL); Aviad Kipnis, Efrat (IL); Shabbir Ahmed, Beaverton, OR (US); Christopher Gutierrez, Hillsboro, OR (US); Vuk Lesi, Durham, NC (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/077,205

(22) Filed: Dec. 7, 2022

(65) Prior Publication Data

US 2023/0179609 A1    Jun. 8, 2023

Related U.S. Application Data

(63) Continuation of application No. 16/712,479, filed on Dec. 12, 2019, now Pat. No. 11,570,186.

(51) Int. Cl.
*H04L 9/40*      (2022.01)
*H04L 12/40*     (2006.01)
*H04L 47/31*     (2022.01)

(52) U.S. Cl.
CPC ......... *H04L 63/1416* (2013.01); *H04L 12/40* (2013.01); *H04L 47/31* (2013.01); *H04L 63/0236* (2013.01); *H04L 63/126* (2013.01); *H04L 63/1466* (2013.01); *H04L 2012/40215* (2013.01)

(58) Field of Classification Search
CPC .................. H04L 63/1416; H04L 63/145
See application file for complete search history.

(56) References Cited

U.S. PATENT DOCUMENTS

| | | | | |
|---|---|---|---|---|
| 5,440,723 A * | 8/1995 | Arnold | ................. | G06F 21/566 |
| | | | | 714/33 |
| 7,203,962 B1 * | 4/2007 | Moran | ................. | G06F 21/52 |
| | | | | 726/25 |
| 10,652,081 B1 * | 5/2020 | El-Ali | ................. | H04L 51/23 |
| 11,570,186 B2 * | 1/2023 | Juliato | ................. | H04L 63/1466 |
| 2002/0004908 A1 * | 1/2002 | Galea | ................. | H04L 63/1416 |
| | | | | 714/E11.212 |
| 2003/0115485 A1 * | 6/2003 | Milliken | ................. | H04L 51/212 |
| | | | | 726/24 |
| 2004/0030906 A1 * | 2/2004 | Marmigere | ........... | H04W 12/10 |
| | | | | 713/189 |

(Continued)

Primary Examiner — Ponnoreay Pich
(74) Attorney, Agent, or Firm — KDW Firm PLLC

(57) ABSTRACT

Techniques and screening messages based on tags in an automotive environment, such as, messages communicated via a communication bus, like the CAN bus. Messages can be tagged with either a binary or probabilistic tag indicating whether the message is fraudulent. ECUs coupled to the CAN bus can receive the messages and the message tags and can determine whether to fully consume the message based on the tag.

20 Claims, 15 Drawing Sheets

(56) References Cited

U.S. PATENT DOCUMENTS

| | | | |
|---|---|---|---|
| 2007/0192863 A1* | 8/2007 | Kapoor | H04L 67/10 |
| | | | 726/23 |
| 2015/0200957 A1* | 7/2015 | Zhang | G08G 1/163 |
| | | | 726/22 |
| 2015/0358351 A1* | 12/2015 | Otsuka | H04L 12/66 |
| | | | 726/23 |
| 2016/0149934 A1* | 5/2016 | Frank | H04L 63/10 |
| | | | 726/23 |
| 2016/0197944 A1* | 7/2016 | Allouche | H04L 63/1416 |
| | | | 726/23 |
| 2018/0336495 A1* | 11/2018 | Chestnut | G06N 5/04 |
| 2019/0052654 A1* | 2/2019 | Juliato | H04L 63/1416 |
| 2019/0104143 A1* | 4/2019 | Maeda | B60R 16/0231 |
| 2019/0109820 A1* | 4/2019 | Clark | H04L 63/0227 |
| 2019/0114437 A1* | 4/2019 | Kim | H04L 63/1433 |
| 2019/0132273 A1* | 5/2019 | Ryan | H04L 63/1483 |
| 2019/0268420 A1* | 8/2019 | Acharya | H04L 63/166 |
| 2019/0306180 A1* | 10/2019 | Dyakin | G06F 21/566 |
| 2020/0120114 A1* | 4/2020 | Juliato | H04L 12/40 |
| 2021/0058408 A1* | 2/2021 | Goodsitt | H04L 63/1416 |
| 2021/0075807 A1* | 3/2021 | Park | H04L 9/0891 |

* cited by examiner

SECURITY REPORTING VIA MESSAGE TAGGING

CROSS-REFERENCE OF RELATED APPLICATIONS

This application is a continuation of, claims the benefit of and priority to previously filed U.S. patent application Ser. No. 16/712,479 filed Dec. 12, 2019, entitled "SECURITY REPORTING VIA MESSAGE TAGGING", issued as U.S. Pat. No. 11,570,186, which is hereby incorporated by reference in its entirety.

TECHNICAL FIELD

Embodiments described herein generally relate to tagging messages transmitted on a controller area network bus, and more specifically, to tagging messages to include security analysis indications.

BACKGROUND

Modern automobiles include a number of sensors, controllers, and processors. These devices often communicate signals and/or messages via a common bus. For example, messages can be communicated between devices via a controller area network (CAN) bus. Consumption of malicious signals and/or messages can directly impact the behavior of the automobile.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Various embodiments of the present disclosure provide for tagging messages with indications of a security analysis. Furthermore, systems configured to consume such messages can be further configured to act based on the message tag or based on the results of the security analysis. In general, the present disclosure is directed towards communication busses, which can be implemented in a variety of contexts, such as, for example, industrial networks, vehicular networks, manufacturing networks, retail operation networks, warehousing networks, or the like. Although vehicular networks are often used in this description as an example implementation, the claims are not limited to networks implemented in a vehicle. However, using vehicles as an example, modern vehicles have many (often hundreds) of electronic control units (ECUs) for various subsystems. For example, there are multiple ECUs for engine control, transmission, airbags, antilock braking, cruise control, electric power steering, audio systems, power windows, power doors, power mirror adjustment, battery, recharging systems for hybrid/electric cars, environmental control systems, auto start stop systems, blind spot monitoring, lane keeping assist systems, collision avoidance systems, and more complex systems in the case of autonomous, or semi-autonomous vehicles.

Many of these ECUs need to consume data from sensors and send control signals to actuators. For example, a collision avoidance systems may consume data from speed sensors and an object sensor (e.g., radar, a camera, or the like) from an in-vehicle network (IVN). The collision avoidance ECU can consume this data from the IVN. The collision avoidance ECU can then determine an appropriate action based on the consumed sensor data. For example, where a potential collision is detected, the collision avoidance system may send a control signal (via the IVN) to actuate the braking system and/or may notify the driver. In some instances, malicious actors may inject fake, or misleading, messages onto the IVN. As a specific example, a malicious actor can consume messages with fake speed sensor data, and specifically an indication that the speed is lower than it actually is. As a result, systems, such as, the collision avoidance system, may not take the appropriate action, or may not take action in time to avoid a collision.

Accordingly, the present disclosure provides for tagging messages to include an indication of an authenticity, an indication of an outcome of a security analysis, or both. In the following description, numerous specific details such as processor and system configurations are set forth in order to provide a more thorough understanding of the described embodiments. However, the described embodiments may be practiced without such specific details. Additionally, some well-known structures, circuits, and the like have not been shown in detail, to avoid unnecessarily obscuring the described embodiments.

Figure 1:
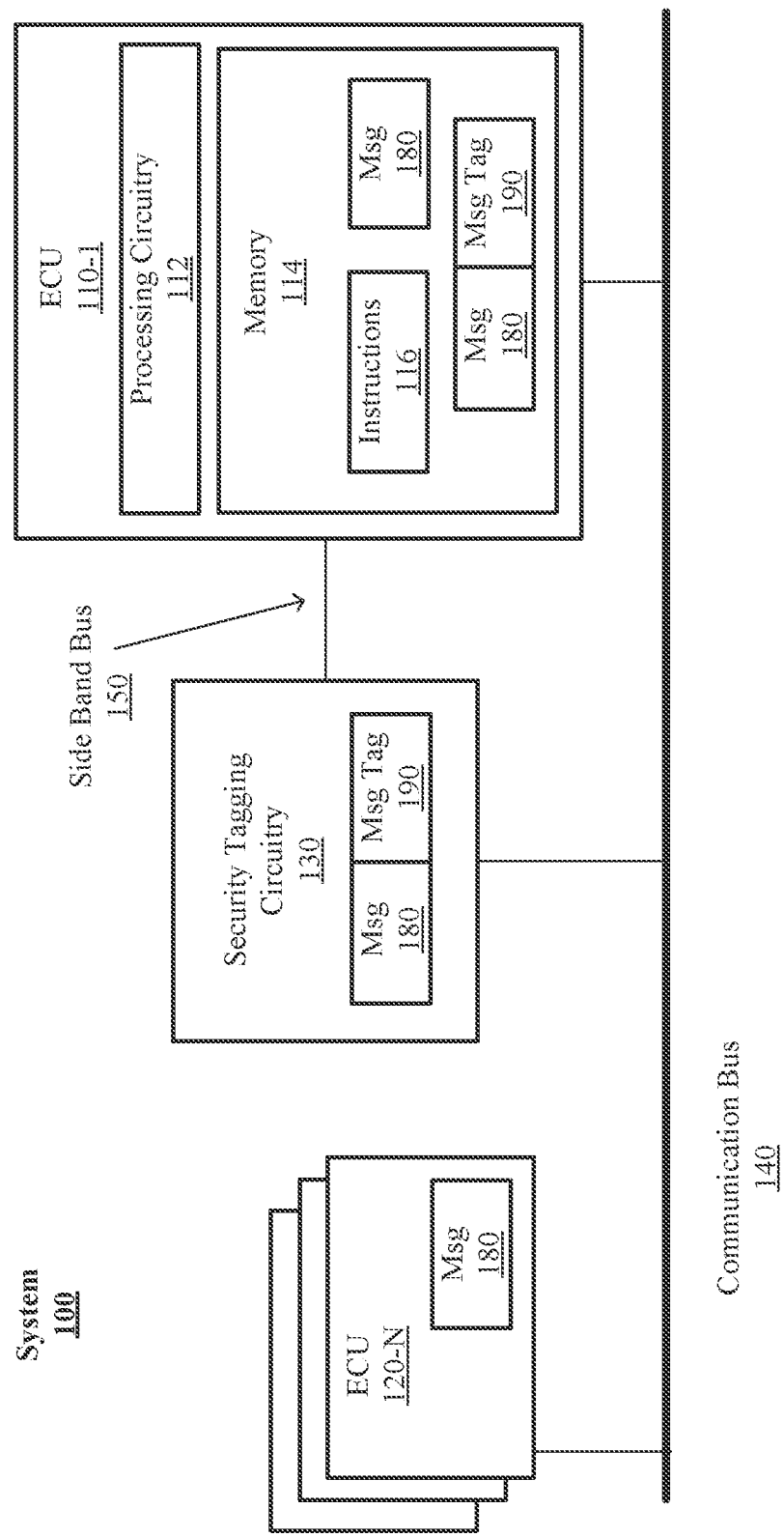
FIG. 1 illustrates a first system to report security of messages via tagging.

FIG. 1 illustrates an example system 100, which can be implemented in a vehicle, such as, for example, an automobile, a motorcycle, an airplane, a boat, a personal watercraft, an all-terrain vehicle, or the like. System 100 includes an electronic control unit (ECU) 110 and a number of ECUs 120, and security tagging circuitry 130. ECU 110, ECU 120, and security tagging circuitry 130 are communicatively coupled via communication bus 140. In some examples, communication bus 140 can be a CAN bus a FlexRay bus, a CAN FD bus, an automotive ethernet bus, or a local interconnected network (LIN) bus. Additionally, where implemented in contexts outside of the automotive space, the communication bus 140 can be a network adapted to the implementation, such as, for example, a communication network for manufacturing equipment, or the like.

In general, ECU 110 includes circuitry arranged to consume messages and send control signals based on the consumed messages. As depicted, ECU 110 includes processing circuitry 112 and memory 114. Memory 114 includes instructions 116 (e.g., firmware, or the like) that can be executed by processing circuitry 112. ECUs 120-N (where N is a positive integer) can be any of a variety of sensors, actuators, controllers, telecommunications, infotainment, etc. An exhaustive list of functions is not provided. However, a speed sensor is used in many of the examples herein for purposes of clarity of presentation. This is not intended to be limiting and the ECU 120 can be any sensor or output device arranged to generate messages as described herein.

During operation, ECU 120 can be arranged to generate a message (msg) 180 comprising an indication of some information, environmental condition, or other data. For example, in the case of the ECU 120 being a speed sensor, message 180 can include an indication of a vehicle speed, a wheel speed, or the like. ECU 120 can transmit message 180 on communication bus 140. ECU 110 can consume message 180 from communication bus 140.

Additionally, security tagging circuitry 130 can consume message 180 from communication bus 140 and determine an authenticity or security profile for message 180. Security tagging circuitry 130 can generate a message tag 190 and can communicate the message tag 190 to ECU 110. With some examples, security tagging circuitry 130 may be coupled to ECU via a side band bus 150, as such message tag 190 can be communicated to ECU 110 via side band bus 150. As another example, message tag 190 can be communicated to ECU via communication bus 140. In some examples, security tagging circuitry 130 can send an information element (e.g., data structure, or the like) comprising an indication of the message 180 and the generated message tag 190 to ECU 110.

As noted, message tag 190 can include an indication of the authenticity of message 180. In some examples, message tag 190 can be a binary tag including an indication of whether the message 180 is authentic or not authentic. In some examples, message tag 190 can include an indication of a probabilistic measure of authenticity of the message 180. For example, message tag 190 can include an indication that message 180 is authentic with a percentage amount of certainty.

During operation, processing circuitry 112 can execute instructions 116 to consume message 180 from communication bus 140 and can receive message tag 190 associated with message 180 from security tagging circuitry 130. Furthermore, processing circuitry 112 can execute instructions 116 to determine whether to fully consume message 180 or to discard message 180 based on message tag 190. For example, based on message tag 190, ECU 110 may determine that message 180 is likely not fraudulent or malicious and may fully consume message 180. As another example, ECU 110 may determine, based on message tag 190, that message 180 is likely fraudulent or malicious and may discard message 180.

Figure 2A:
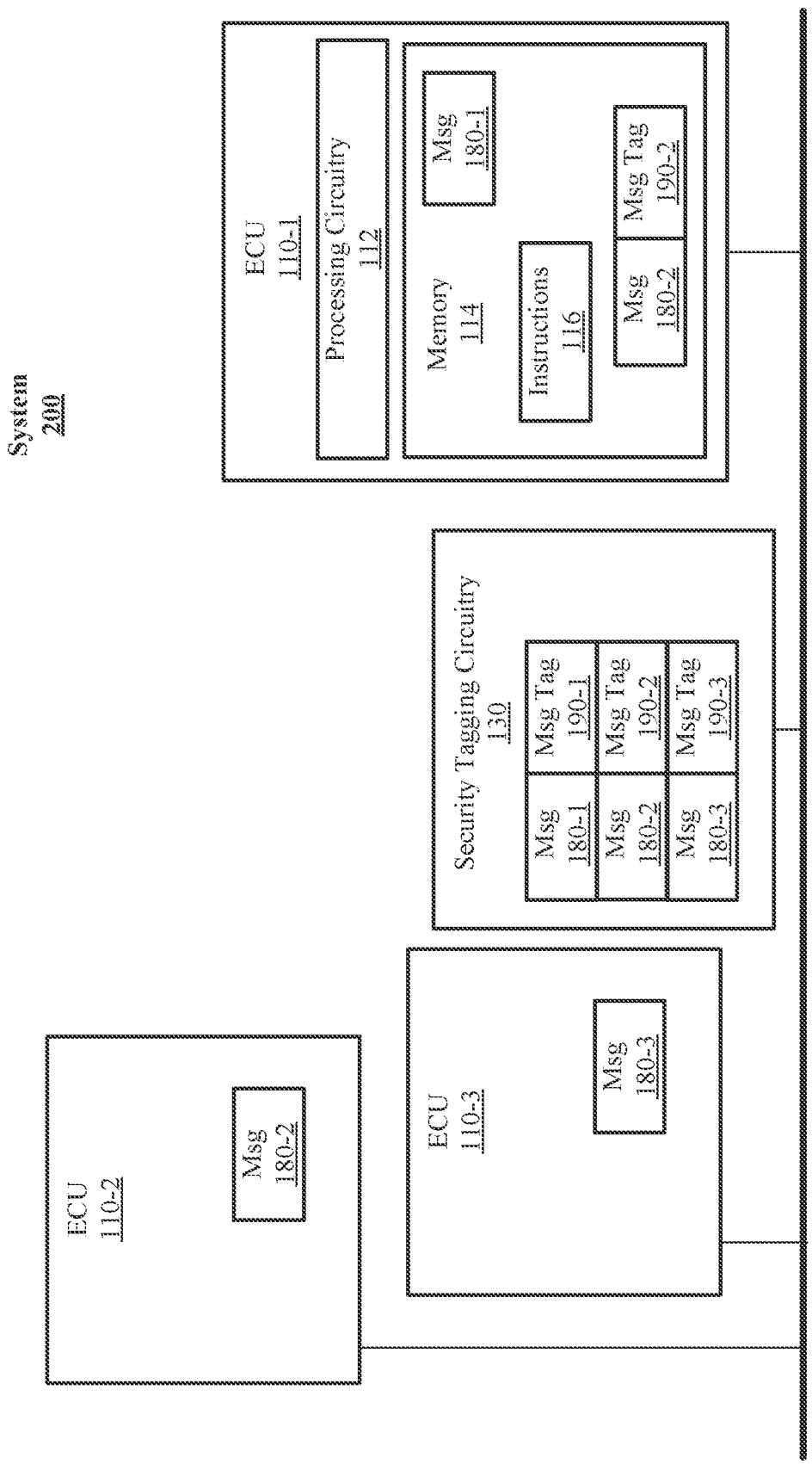
FIG. 2A illustrates a second system to report security of messages via tagging.

It is noted, that system 100 can be implemented with multiple ECUs where security tagging reporting happens through the communication bus 140, rather than a side band bus. Additionally, ECUs can be arranged to generate and/or process and/or consume messages. FIG. 2A illustrates an example system 200. System 200 includes the features of system 100 with the addition that multiple ECUs 110 are depicted. For example, ECUs 110-2 and 110-3 can each be arranged to generate messages. For example, messages 180-2 and 180-3 are depicted having been generated by ECUs 110-2 and 110-3, respectively, and transmitted onto communication bus 140. Additionally, ECU 110-1 is depicted generating message 180-1. Furthermore, although not depicted here, an ECU 110 can include processing circuitry 112, memory 114. Example are not limited to this concept. Security tagging circuitry 130 and ECUs 110 can receive messages from and transmit messages and message tags to the communication bus 140 as described above.

Figure 2B:
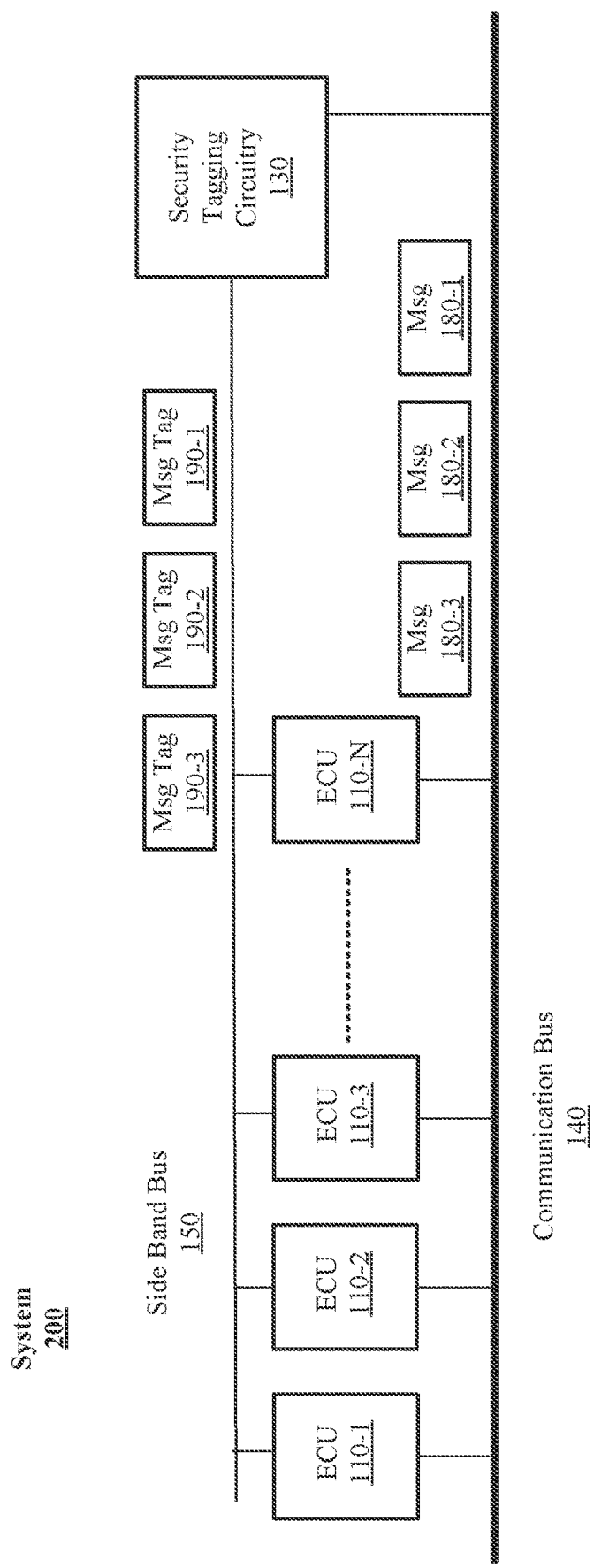
FIG. 2B illustrates a third system to report security of messages via tagging.

Security tagging circuitry 130 can generate message tags 190 for each message 180. For example, message tags 190-1, 190-2, and 190-3 corresponding to messages 180-1, 180-2, and 180-3 are depicted having been generated. As noted above, message tags can be communicated by security tagging circuitry via side band bus 150. For example, FIG. 2B illustrates the system 200 of FIG. 2A showing ECU 110-1, ECU 110-2, ECU 110-3, through ECU 110-N. Messages 180-1 to 180-3 are depicted communicated via communication bus 140 while message tags 190-1 to 190-3 are depicted communicated via side band bus 150.

Figure 2C:
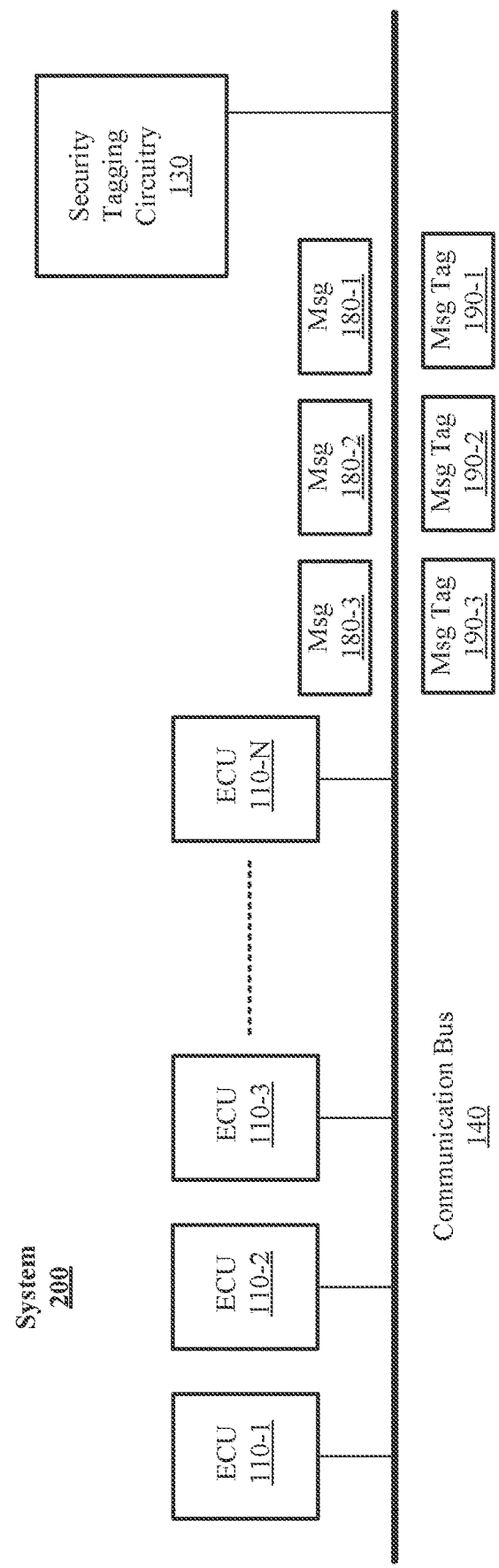
FIG. 2C illustrates a fourth system to report security of messages via tagging.

Furthermore, it is important to note that any number of ECUs with various functions (e.g., sensors, actuators, controllers, etc.) can be provided. For example, FIG. 2C illustrates the system 200 of FIG. 2A showing ECU 110-1, ECU 110-2, ECU 110-3, through ECU 110-N. Messages 180-1 to 180-3 along with message tags 190-1 to 190-3 are depicted communicated via communication bus 140. In the examples depicted in FIGS. 2B and 2C, N can be any positive integer.

Processor 110 can include any of a variety of processors, such as, for example, commercial central processing units, application specific integrated circuits, or the like. Processor 110 can be a microprocessor or a commercial processor. Processor 110 can include multiple processing core(s) and cache.

Memory 114 can be based on any of a wide variety of information storage technologies. For example, memory 114 can be based on volatile technologies requiring the uninterrupted provision of electric power or non-volatile technologies that do not require and possibly including technologies entailing the use of machine-readable storage media that may or may not be removable. Thus, each of these storages may include any of a wide variety of types (or combination of types) of storage devices, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, or a plurality of storage devices organized into one or more arrays (e.g., multiple ferromagnetic disk drives organized into a Redundant Array of Independent Disks array, or RAID array).

Figure 3:
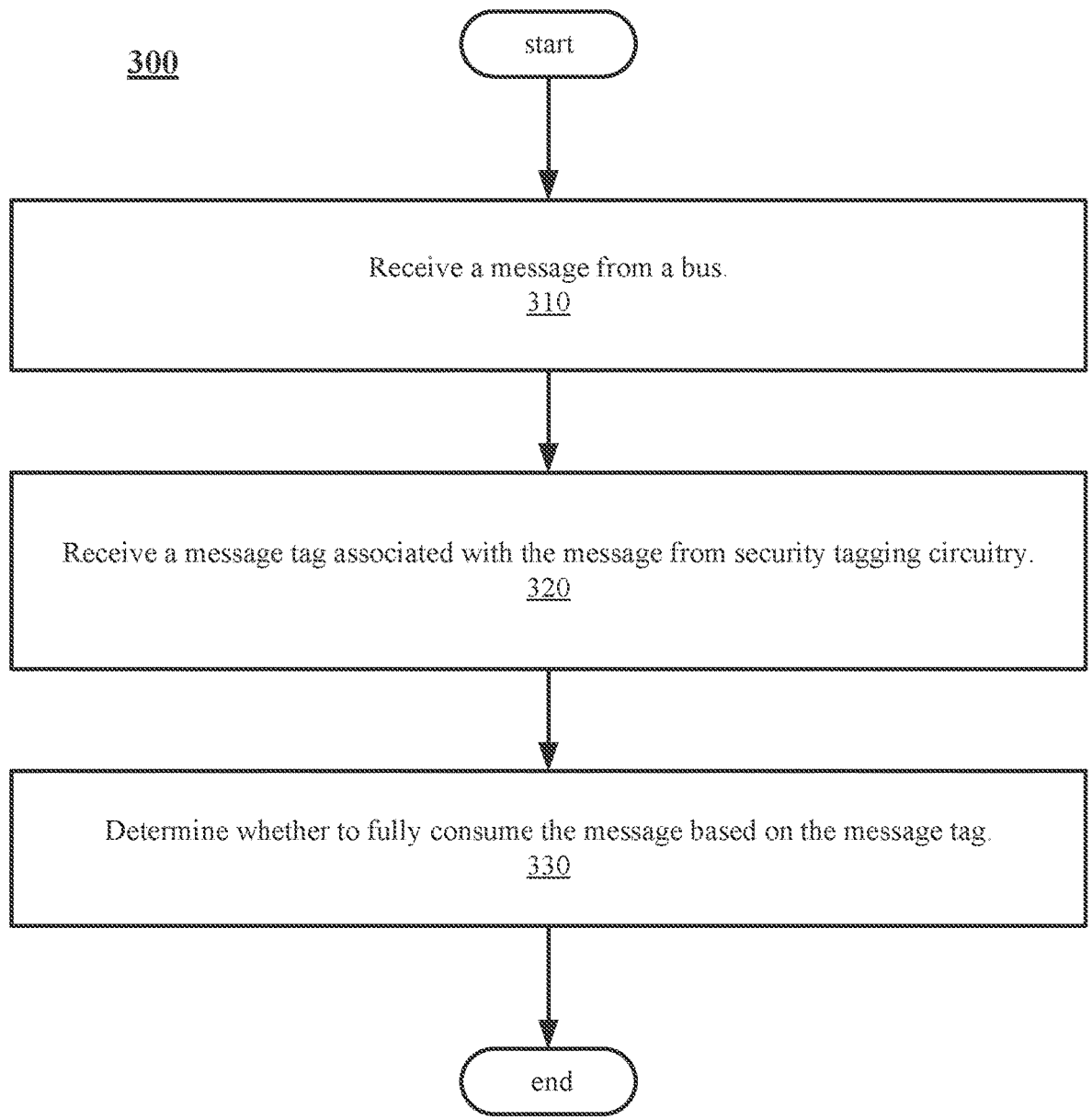
FIG. 3 illustrates a first logic flow to screen messages based on tags.

FIG. 3 depicts a logic flow 300. Logic flow 300 can be implemented by an ECU (e.g., ECU 110, or the like) as part of a message tagging processor. The logic flows described herein, including logic flow 300 and other logic flows described herein, are representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Logic flow 300 may begin at block 310. At block 310 "receive a message from a bus" a processor can receive a message from a bus. For example, ECU 110 can receive message 180 from communication bus 140. With some examples, ECU 110 can include a message register (e.g., refer to FIGS. 5-7). In such an example, ECU 110 can receive message(s) 180 in such a message register. Continuing to block 320 "receive a message tag associated with the message from security tagging circuitry" a processor can receive a message tag from a bus. For example, ECU 110 can receive message tag 190 from communication bus 140, where message tag 190 is associated with message 180. With some examples, ECU 110 can include a message tag register (e.g., refer to FIGS. 5-7). In such as example, ECU 110 can receive message tag(s) 190 in such a message tag register.

Continuing to block 330 "determine whether to fully consume the message based on the message tag" a processor can determine whether to fully consume the message based on the message tag. As used herein, the term fully consume is intended to mean rely on, use, process, or the like the message. For example, where the ECU 100 is provided as part of an automotive collision avoidance system and the message comprises a speed value, the ECU 110 can determine whether to use the speed value in collision avoidance determinations based on the message tag. This is described in greater detail below, for example, with reference to FIGS. 5-11.

Figure 4A:
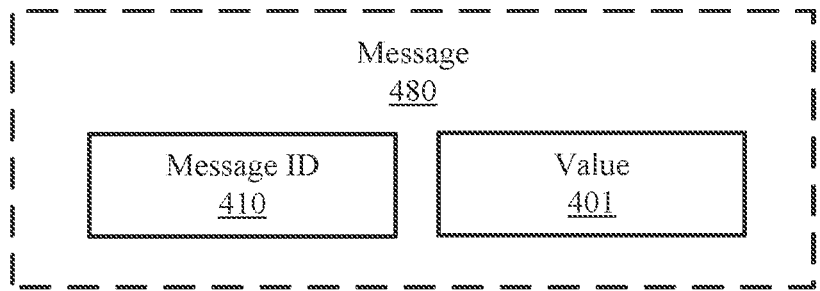
FIG. 4A illustrates an example message.

FIG. 4A illustrates an example message 480. Messages 180 referenced herein (e.g., messages 180 of FIG. 1, or the like) can have a format or data structure similar to the message 480 depicted in FIG. 4A. As illustrated, message 480 can include an indication of a message identifier 410 (message ID) and an indication of a value 401. It is noted, that value 401 can be the value itself, a hash of a value, a digest of the value, or the like.

Figure 4B:
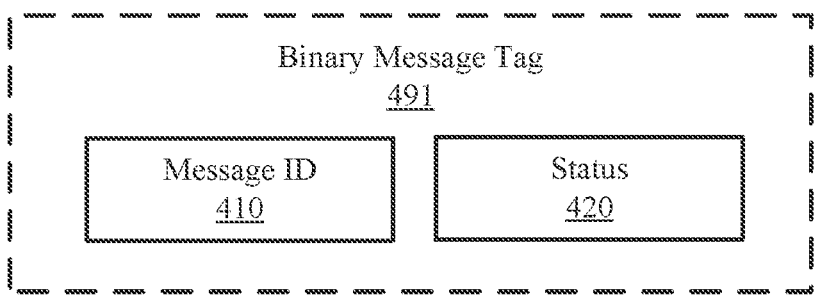
FIGS. 4B and 4C illustrate examples of message tags.
Figure 4C:
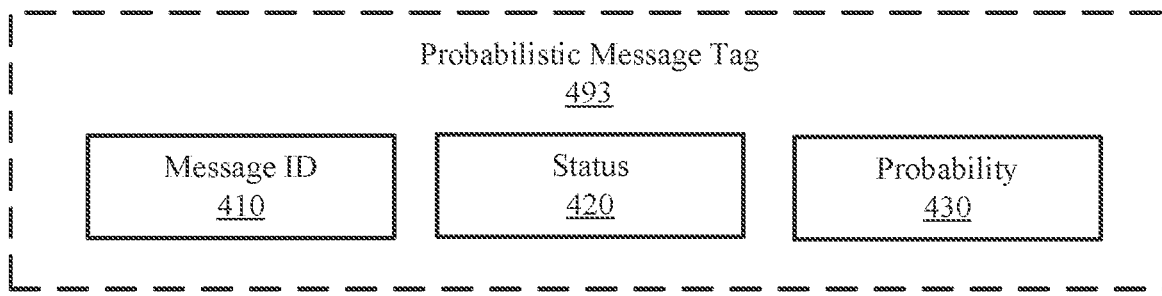

FIGS. 4B and 4C illustrate example message tags 491 and 493 respectively. Message tags 190 referenced herein (e.g., message tags 190 of FIG. 1, or the like) can have a format or data structure similar to the message tags 491 or 493 depicted in these figures. As illustrated, message tag 491 can include an indication of message ID 410 and an indication of a status 420. In general, status can include an indication of whether the message associated with message ID 410 is fraudulent or not. Said differently, status 420 can include a binary indication of whether the message 180 associated with message ID 410 is fraudulent (or not). In some examples, message tag 190 can also include a probabilistic indication. For example, message tag 493 includes probability 430 which includes an indication of a probability of the status.

Figure 5:
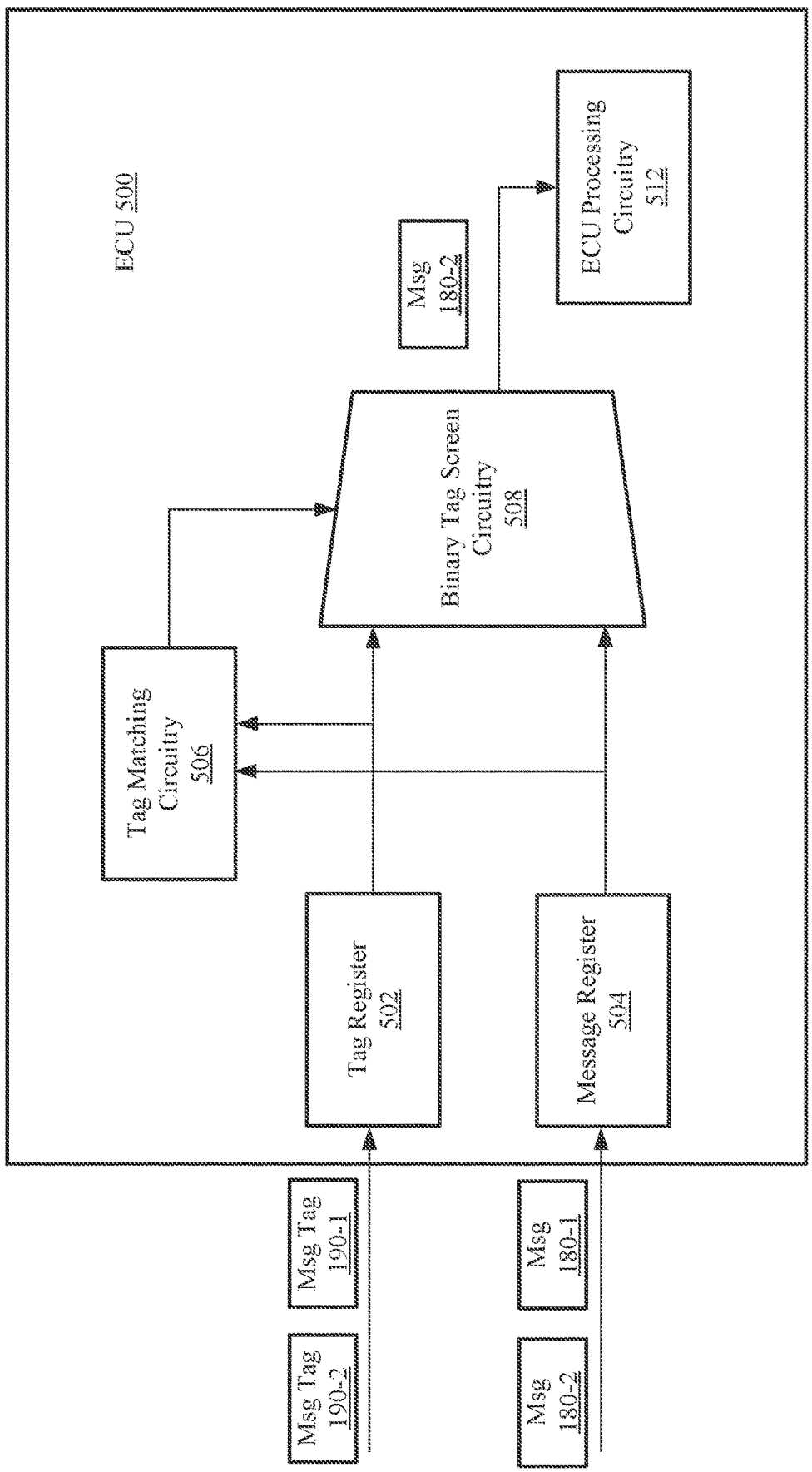
FIG. 5 illustrates a first ECU.
Figure 6:
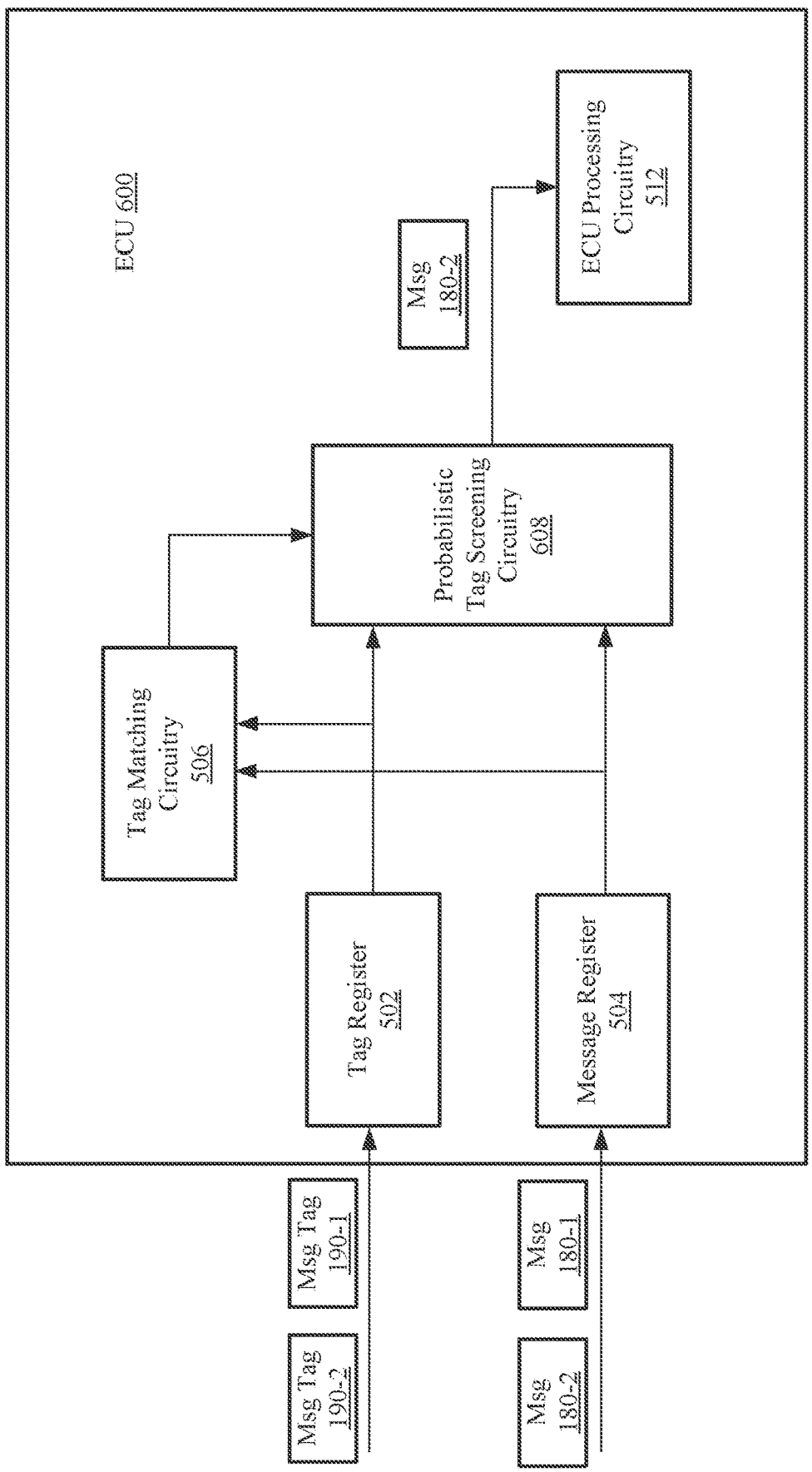
FIG. 6 illustrates a second ECU.
Figure 7:
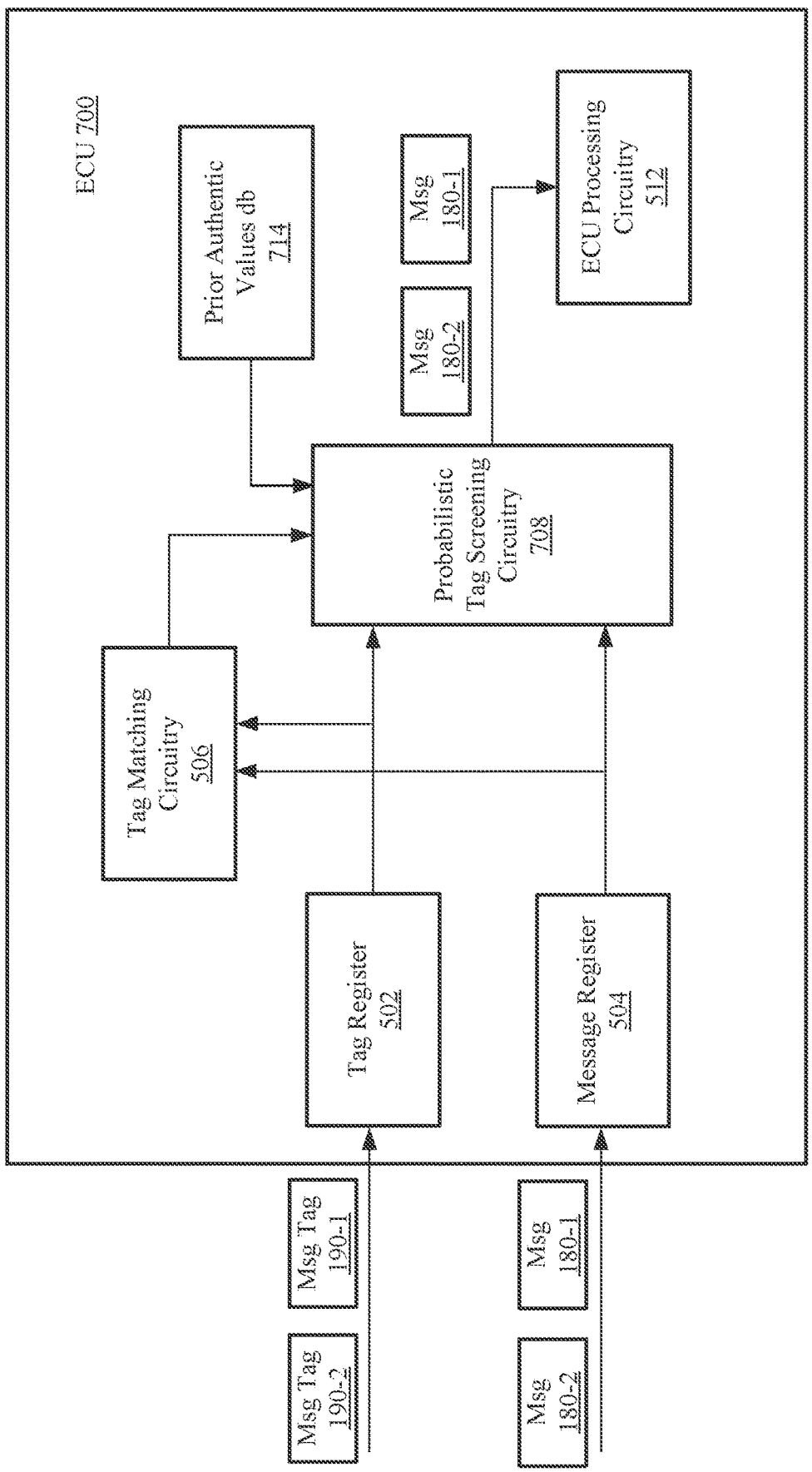
FIG. 7 illustrates a third ECU.

FIGS. 5-7 illustrate example ECUs 500, 600, and 700, respectively. ECUs 500, 600, and 700 can be implemented as ECU 110 reference herein (e.g., ECU 110 of FIG. 1, or the like). In general, ECU 500 may be arranged to process binary message tags (e.g., message tag 491, or the like) while ECUs 600 and 700 may be arranged to process probabilistic message tags (e.g., message tag 493, or the like).

Referring to FIG. 5, ECU 500 can include tag register 502 and message register 504. In some examples, tag register 502 and message register 504 can be first-in-first-out (FIFO) registers arranged to receive tags 190 and messages 180 from communication bus 140 and store the tags 190 and messages 180 in the registers. ECU 500 further includes tag matching circuitry 506. Tag matching circuitry 506 can be arranged to endure that message ID 410 from message tag 190 and message 180 match and to enable binary tag screen circuitry 508 based on a determination that the message IDs 410 match. In some examples, tag matching circuitry 506 can be implemented as instructions executable by processing circuitry (e.g., instructions 116 executable by circuitry 112, or the like). In another example, tag matching circuitry 506 can be logic circuitry, such as an AND gate, or the like, arranged to enable binary tag screen circuitry 508 when message IDs 410 match.

Binary tag screen circuitry 508 can be arranged to forward, when enabled by tag matching circuitry 506, a message to ECU processing circuitry 512 where the status 420 of message tag 190 indicates the message 180 is not fraudulent. For example, message 180-2 is depicted forwarded to ECU processing circuitry 512. In the alternative, binary tag screen circuitry 508 can be arranged to discard a message where the status 420 of message tag 190 indicates the message 180 is fraudulent. With further examples, binary tag screen circuitry 508 can be arranged to discard a message when not enabled (e.g., where the message IDs 410 do not match).

Referring to FIG. 6, ECU 600 can include tag register 502, message register 504, tag matching circuitry 506, and ECU processing circuitry 512 described with reference to FIG. 5 and ECU 500. However, instead of binary tag screening circuitry 508, ECU 600 includes probabilistic tag screening circuitry 608. Probabilistic tag screening circuitry 608 can be arranged to forward, when enabled by tag matching circuitry 506, a message to ECU processing circuitry 512 where the status of message tag 190 indicates the message 180 is not fraudulent or where the status 420 of the message tag 190 indicates the message 180 is fraudulent but the probability 430 is less than (or less than or equal to) a threshold value. For example, message 180-2 is depicted forwarded to ECU processing circuitry 512. In the alternative, probabilistic tag screening circuitry 608 can be arranged to discard a message where the status 420 of message tag 190 indicates the message 180 is fraudulent and the probability 430 is greater (or greater than or equal to) the threshold value. With further examples, probabilistic tag screening circuitry 608 can be arranged to discard a message when not enabled (e.g., where the message IDs 410 do not match).

Referring to FIG. 7, ECU 700 can include tag register 502, message register 504, tag matching circuitry 506, and ECU processing circuitry 512 described with reference to FIG. 5 and ECU 500. However, instead of binary tag screening circuitry 508, ECU 700 includes probabilistic tag screening circuitry 708. ECU 700 further includes prior authentic values database (db) 714.

Probabilistic tag screening circuitry 708 can be arranged to forward, when enabled by tag matching circuitry 506, a message to ECU processing circuitry 512 where [1] the status of message tag 190 indicates the message 180 is not fraudulent, [2] the status 420 of the message tag 190 indicates the message 180 is fraudulent but the probability 430 is less than (or less than or equal to) a threshold value, or [3] the status 420 of the message tag 190 indicates the message 180 is fraudulent but the value 401 of the message 180 is similar (e.g., within a standard deviation of, fitting a trend line of recent authentic values, or the like) to recent authentic values indicated in prior authentic value db 714.

In the alternative, probabilistic tag screening circuitry 708 can be arranged to discard a message where [1] the status 420 of message tag 190 indicates the message 180 is fraudulent and the probability 430 is greater (or greater than or equal to) the threshold value or [2] the status 420 of message tag 190 indicates the message 180 is fraudulent and the value 401 is not similar to prior authentic values. With further examples, probabilistic tag screening circuitry 608 can be arranged to discard a message when not enabled (e.g., where the message IDs 410 do not match).

Figure 8:
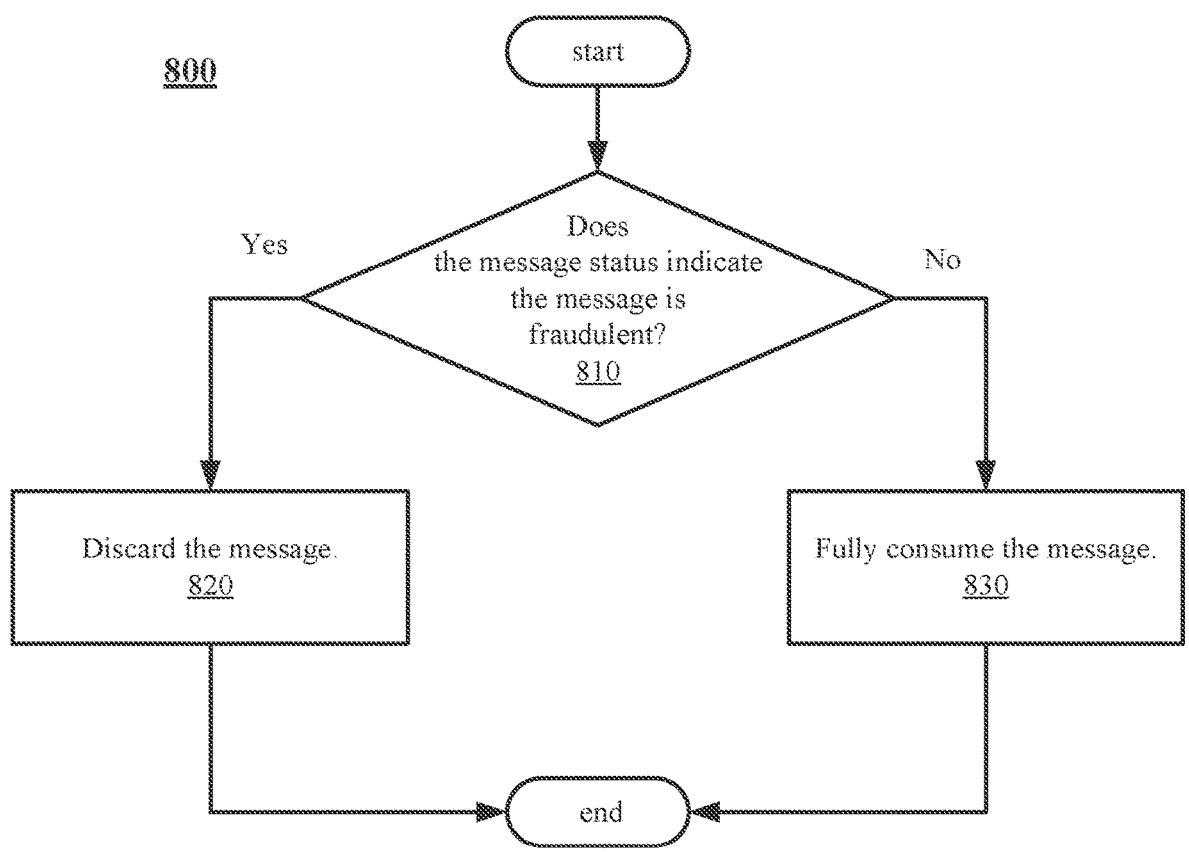
FIG. 8 illustrates a first logic flow to determine whether to consume messages based on message tags.

FIGS. 8-11 illustrate logic flows for determining whether to fully consume messages. These logic flows can be implemented as part of logic flow 300 of FIG. 3, and particularly, as part of block 330 of logic flow 300. Turning more particularly to FIG. 8, logic flow 800 is depicted. Logic flow 800 can begin at decision block 810 "does the message status indicate the message is fraudulent?" a processor can determine whether a message status of the message tag indicates the associated message is fraudulent. For example, binary tag screening circuitry 508 can determine whether the status 420 of a message tag 190 indicates the message 180 associated with the message tag (e.g., having matching message ID 410) is fraudulent. From decision block 810, logic flow 800 can continue to either block 820 or block 830. For example, based on a determination that the message status indicates the message is fraudulent, logic flow 800 can continue to block 820. Alternatively, logic flow 800 can continue to block 830 based on a determination that the message status indicates the message is not fraudulent. At block 820 "discard the message" a processor can discard the message. For example, binary tag screening circuitry 508 of ECU 500 can discard a message (e.g., FIG. 5 depicts message 180-1 being discarded). At block 830 "fully consume the message" a processor can fully consume the message. For example, binary tag screening circuitry 508 of ECU 500 can forward a message (e.g., FIG. 5 depicts message 180-2 being forwarded) to ECU processing circuitry 512.

Figure 9:
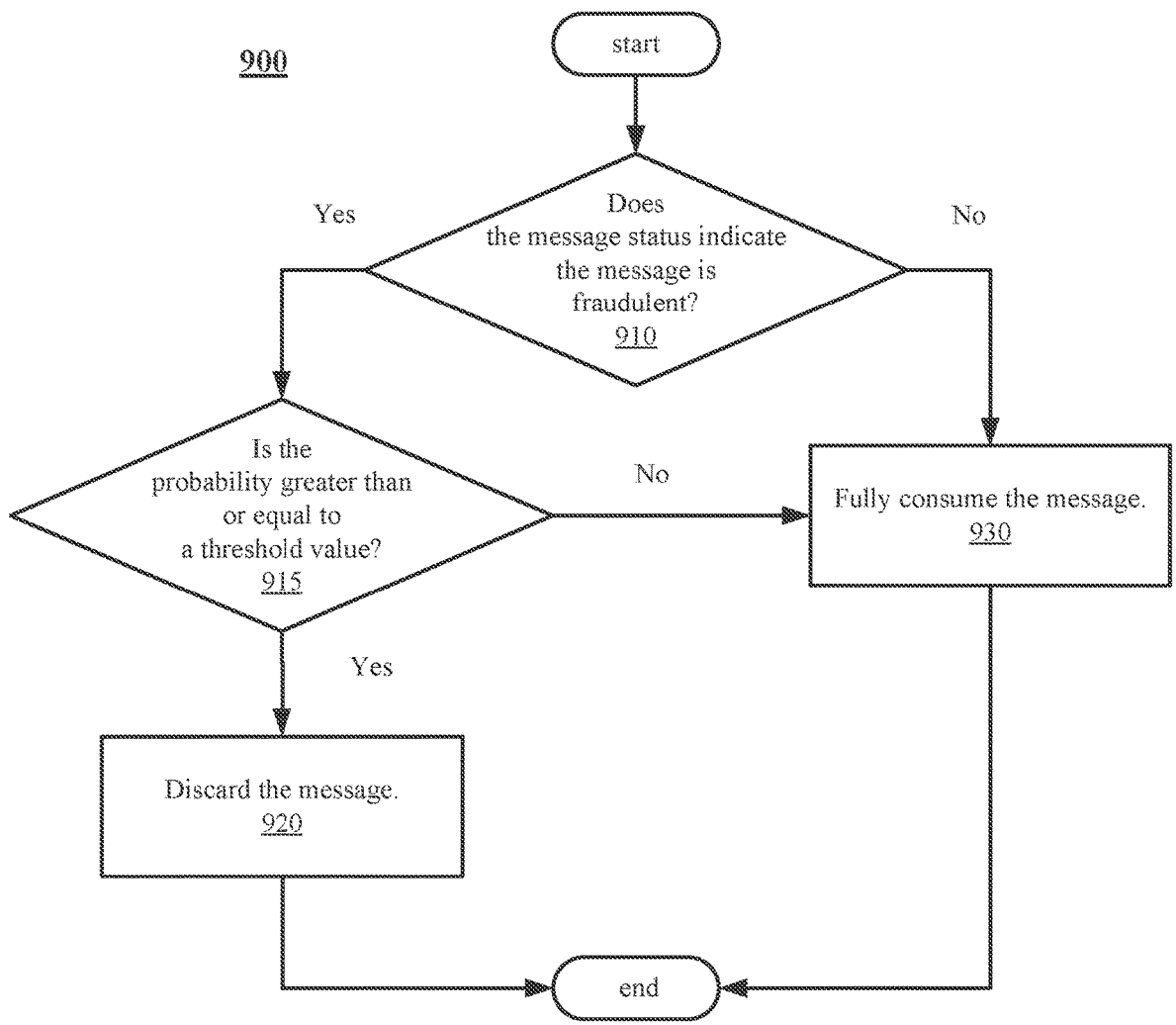
FIG. 9 illustrates a second logic flow to determine whether to consume messages based on message tags.

Turning more particularly to FIG. 9, logic flow 900 is depicted. Logic flow 900 can begin at decision block 910 "does the message status indicate the message is fraudulent?" a processor can determine whether a message status of the message tag indicates the associated message is fraudulent. For example, probabilistic tag screening circuitry 608 can determine whether the status 420 of a message tag 190 indicates the message 180 associated with the message tag (e.g., having matching message ID 410) is fraudulent. From decision block 910, logic flow 900 can continue to either decision block 915 or block 930. For example, based on a determination that the message status indicates the message is fraudulent, logic flow 900 can continue to decision block 915. Alternatively, logic flow 900 can continue to block 930 based on a determination that the message status indicates the message is not fraudulent.

At decision block 915 "is the probability greater than (or greater than or equal to a threshold value?" a processor can determine whether the probability 430 is greater than (or greater than or equal to) a threshold value. From decision block 915, logic flow 900 can continue to either block 920 or block 930. For example, based on a determination that the probability is greater than (or greater than or equal to) a threshold value, logic flow 900 can continue to block 920. Alternatively, logic flow 900 can continue to block 930 based on a determination that the probability is not greater than (or not greater than or equal to) a threshold value.

At block 920 "discard the message" a processor can discard the message. For example, probabilistic tag screening circuitry 608 of ECU 600 can discard a message (e.g., FIG. 6 depicts message 180-1 being discarded). At block 930 "fully consume the message" a processor can fully consume the message. For example, probabilistic tag screening circuitry 608 of ECU 600 can forward a message (e.g., FIG. 6 depicts message 180-2 being forwarded) to ECU processing circuitry 512.

Figure 10:
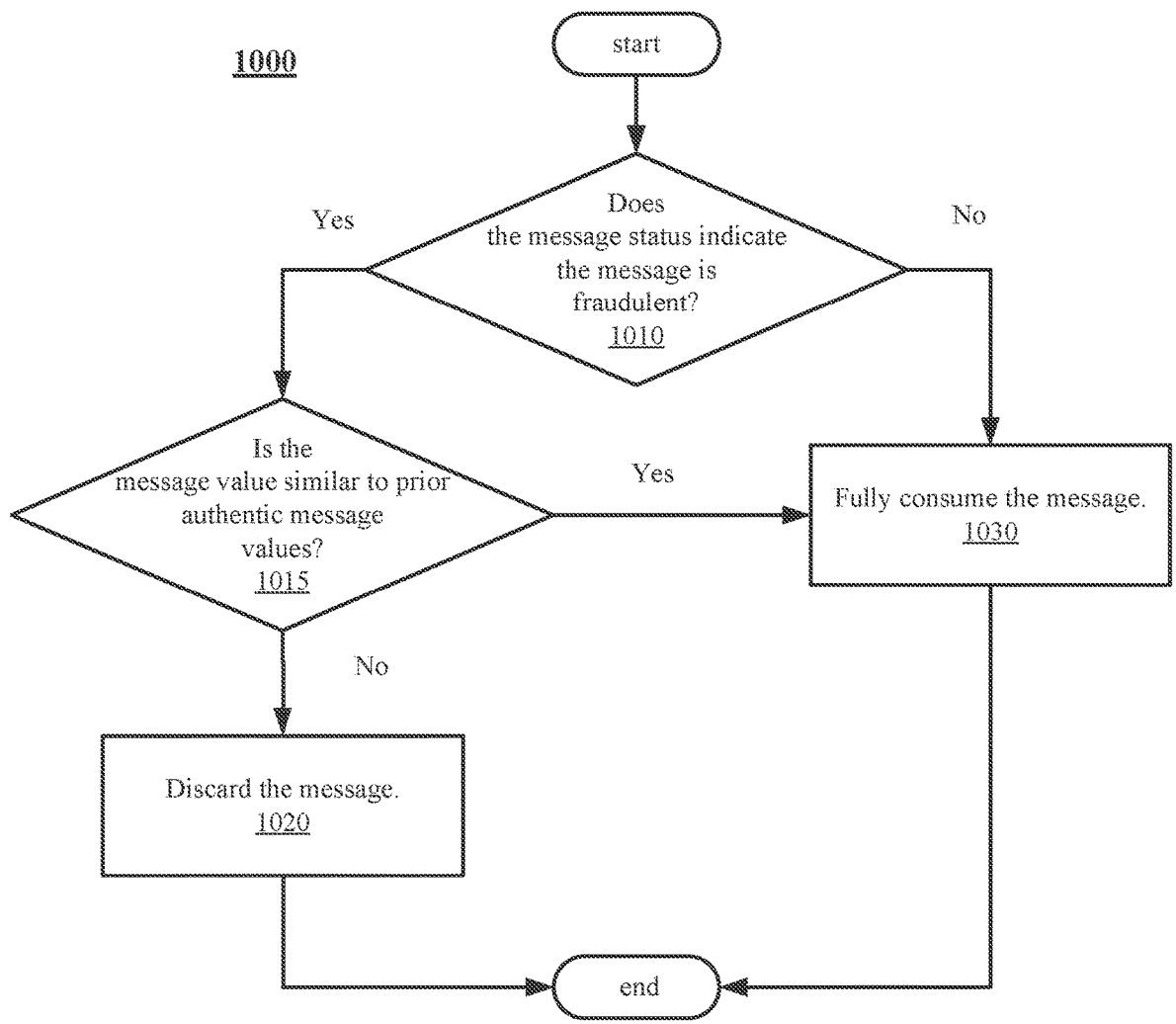
FIG. 10 illustrates a third logic flow to determine whether to consume messages based on message tags.

Turning more particularly to FIG. 10, logic flow 1000 is depicted. Logic flow 1000 can begin at decision block 1010 "does the message status indicate the message is fraudulent?" a processor can determine whether a message status of the message tag indicates the associated message is fraudulent. For example, probabilistic tag screening circuitry 608 can determine whether the status 420 of a message tag 190 indicates the message 180 associated with the message tag (e.g., having matching message ID 410) is fraudulent. From decision block 1010, logic flow 1000 can continue to either decision block 1015 or block 1030. For example, based on a determination that the message status indicates the message is fraudulent, logic flow 1000 can continue to decision block 1015. Alternatively, logic flow 1000 can continue to block 1030 based on a determination that the message status indicates the message is not fraudulent.

At decision block 1015 "is the message value similar to prior authentic message values?" a processor can determine whether the value 401 is similar to prior authentic values (e.g., as indicated in prior authentic value db 614. From decision block 1015, logic flow 1000 can continue to either block 1020 or block 1030. For example, based on a determination that the value is not similar, logic flow 1000 can continue to block 1020. Alternatively, logic flow 1000 can continue to block 1030 based on a determination that the value is similar. At block 1020 "discard the message" a processor can discard the message. At block 1030 "fully consume the message" a processor can fully consume the message.

Figure 11:
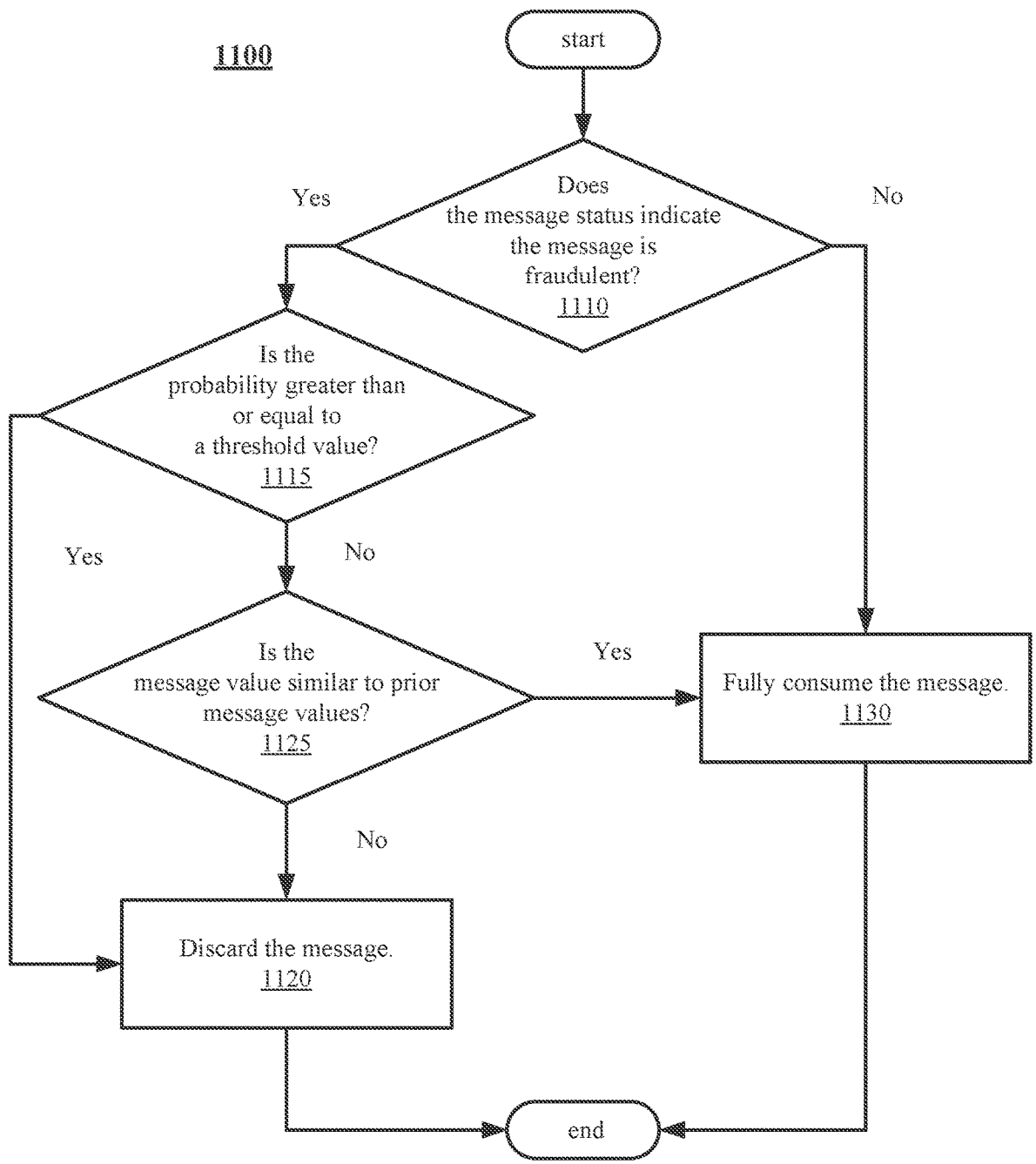
FIG. 11 illustrates a fourth logic flow to determine whether to consume messages based on message tags.

Turning more particularly to FIG. 11, logic flow 1100 is depicted. Logic flow 1100 can begin at decision block 1110 "does the message status indicate the message is fraudulent?" a processor can determine whether a message status of the message tag indicates the associated message is fraudulent. For example, probabilistic tag screening circuitry 608 can determine whether the status 420 of a message tag 190 indicates the message 180 associated with the message tag (e.g., having matching message ID 410) is fraudulent. From decision block 1110, logic flow 1100 can continue to either decision block 1115 or block 1130. For example, based on a determination that the message status indicates the message is fraudulent, logic flow 1100 can continue to decision block 1115. Alternatively, logic flow 1100 can continue to block 1130 based on a determination that the message status indicates the message is not fraudulent.

At decision block 1115 "is the probability greater than (or greater than or equal to a threshold value?" a processor can determine whether the probability 430 is greater than (or greater than or equal to) a threshold value. From decision block 1115, logic flow 1100 can continue to either block 1120 or decision block 1125. For example, based on a determination that the probability is greater than (or greater than or equal to) a threshold value, logic flow 1100 can continue to block 1120. Alternatively, logic flow 1100 can continue to decision block 1125 based on a determination that the probability is not greater than (or not greater than or equal to) a threshold value.

At decision block 1125 "is the message value similar to prior authentic message values?" a processor can determine whether the value 401 is similar to prior authentic values (e.g., as indicated in prior authentic value db 614. From decision block 1125, logic flow 1100 can continue to either block 1120 or block 1130. For example, based on a determination that the value is not similar, logic flow 1100 can continue to block 1120. Alternatively, logic flow 1100 can continue to block 1130 based on a determination that the value is similar. At block 1120 "discard the message" a processor can discard the message. At block 1030 "fully consume the message" a processor can fully consume the message.

Figure 12:
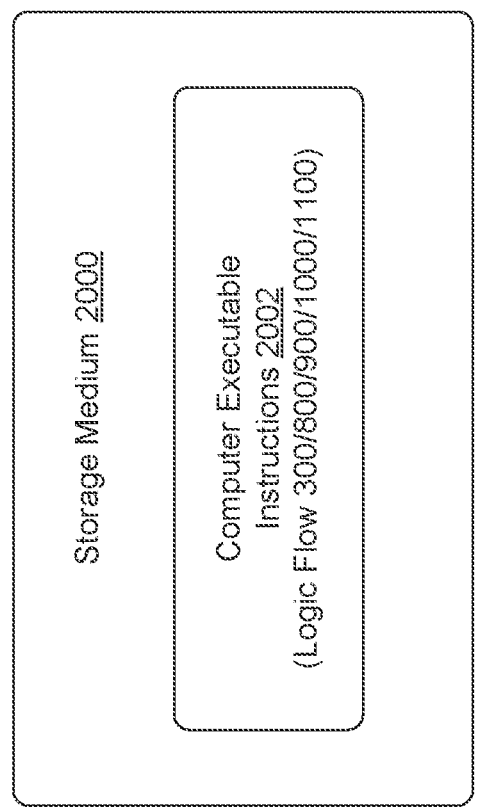
FIG. 12 illustrates an example non-transitory storage medium.

FIG. 12 illustrates an example of a storage medium 2000. Storage medium 2000 may comprise an article of manufacture. In some examples, storage medium 2000 may include any non-transitory computer readable medium or machine readable medium, such as an optical, magnetic or semiconductor storage. Storage medium 2000 may store various types of computer executable instructions, such as instructions to implement logic flow 300, logic flow 800, logic flow 900, logic flow 1000, or logic flow 1100. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 13:
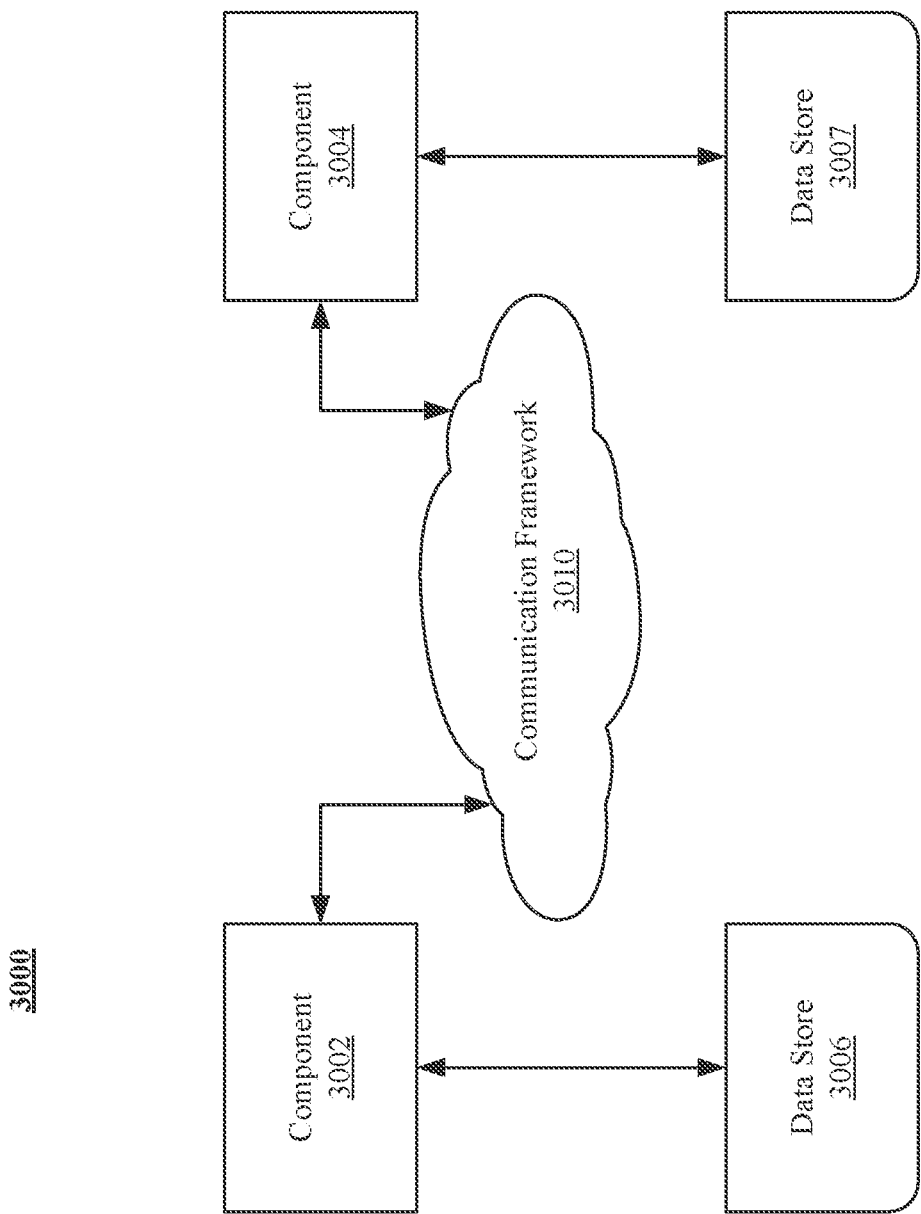
FIG. 13 illustrates an in-vehicle communication architecture.

FIG. 13 illustrates an exemplary in-vehicle communications architecture 3000 according to one or more embodiments of the disclosure. For example, one or more vehicular components, such as component 3002 and 3004, may communicate with each other via a communications framework 3010, which may be an in-vehicle network, such as a CAN bus, implemented to facilitate authentication and confidentiality mechanisms during communications over the network, as described above.

The communications architecture 3000 includes various common communications elements, such as a transmitter, receiver, transceiver, and so forth. The embodiments, however, are not limited to implementation by the communications architecture 3000.

As shown in this figure, the vehicular components 3002 and 3004 may each be operatively connected to one or more respective client data stores 3006 and 3007 that can be employed to store information local to the respective components 3002 and 3004, such as cookies and/or associated contextual information. It may be understood that the components 3002 and 3004 may be any suitable vehicular component, such as sensor, an ECU, microcontroller, microprocessor, processor, ASIC, field programmable gate array (FPGA), any electronic device, computing device, or the like. Moreover, it may be understood that one or more computing devices (containing at least a processor, memory, interfaces, etc.) may be connected to the communication framework 3010 in a vehicle.

Further, the communications framework 3010 may implement any well-known communications techniques and protocols. As described above, the communications framework 3010 may be implemented as a CAN bus protocol or any other suitable in-vehicle communication protocol.

The communications framework 3010 may also implement various network interfaces arranged to accept, communicate, and connect to one or more external communications networks (e.g., Internet). A network interface may be regarded as a specialized form of an input/output (I/O) interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.7a-x network interfaces, IEEE 802.16 network interfaces, IEEE 802.20 network interfaces, and the like. Further, multiple network interfaces may be used to engage with various communications network types. The communication framework 3010 may employ both wired and wireless connections.

The components and features of the devices described above may be implemented using any combination of: processing circuitry, discrete circuitry, application specific integrated circuits (ASICs), logic gates and/or single chip architectures, etc. Further, the features of the devices may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodology, but one of ordinary skill in the art may recognize that many further combinations and permutations are possible. Accordingly, the novel architecture is intended to embrace all such alterations, modifications and variations that fall within the spirit and scope of the appended claims.

The disclosure now turns to a number of illustrative examples.

Example 1. An electronic control unit (ECU) for a vehicle, comprising: a message register to receive a message from a communication bus; a message tag register to receive a message tag, the message tag comprising an indication of a status; and tag screening circuitry to determine whether to fully consume the message based on the status.

Example 2. The ECU of example 1, the message comprising a message ID field and the message tag comprising a message ID field, the ECU comprising tag matching circuitry to: determine whether the message ID of the message matches the message ID of the message tag; and enable the tag screening circuitry based on a determination that the message ID of the message matches the message ID of the message tag.

Example 3. The ECU of example 1, the status a binary indication, the tag screening circuitry to forward the message to ECU processing circuitry based on the binary indication.

Example 4. The ECU of example 3, the status comprising a binary indication of fraudulent or not fraudulent, the tag screening circuitry to forward the message to ECU processing circuitry based on the status indicating being not fraudulent.

Example 5. The ECU of example 1, message tag comprising a probability field, the tag screening circuitry to forward the message to ECU processing circuitry based on the probability field and the status.

Example 6. The ECU of example 1, the communication bus a controller area network (CAN) bus, a FlexRay bus, a CAN FD bus, an automotive ethernet bus, or a local interconnected network (LIN) bus.

Example 7. A system, comprising: an in-vehicle network (IVN); a plurality of electronic control units (ECUs) coupled to the IVN, at least one of the plurality of ECUs comprising: a message register to receive a message from a one of the plurality of ECUs via the IVN; a message tag register to receive a message tag, the message tag comprising an indication of a status; and tag screening circuitry to determine whether to fully consume the message based on the status.

Example 8. The system example 7, comprising security tagging circuitry coupled to the at least one of the plurality of ECUs, the at least one of the plurality of ECUs to receive the message tag from the security tagging circuitry.

Example 9. The system of example 7, the message comprising a message ID field and the message tag comprising a message ID field, the at least one of the plurality of ECUs comprising tag matching circuitry to: determine whether the message ID of the message matches the message ID of the message tag; and enable the tag screening circuitry based on a determination that the message ID of the message matches the message ID of the message tag.

Example 10. The system of example 7, the status a binary indication, the tag screening circuitry to forward the message to ECU processing circuitry based on the binary indication.

Example 11. The system of example 10, the status comprising a binary indication of fraudulent or not fraudulent, the tag screening circuitry to forward the message to the ECU processing circuitry based on the status indicating being not fraudulent.

Example 12. The system of example 7, message tag comprising a probability field, the tag screening circuitry to forward the message to ECU processing circuitry based on the probability field and the status.

Example 13. The system of example 7, the IVN comprising a controller area network (CAN) bus, a FlexRay bus, a CAN FD bus, an automotive ethernet bus, or a local interconnected network (LIN) bus.

Example 14. The system of example 7, the plurality of ECUs comprising one or more sensor ECUs, actuator ECUs, controller ECUs, telecommunication ECUs, or infotainment ECUs.

Example 15. An apparatus, comprising: memory comprising instructions; and processing circuitry arranged to execute the instructions, the processing circuitry coupled to the memory and which when executing the instructions caused to: receive a message from a communication bus, receive a message tag, the message tag comprising an indication of a status, and determine whether to fully consume the message based on the status.

Example 16. The apparatus of example 15, the message comprising a message ID field and the message tag comprising a message ID field, when executing the instructions, the processing caused to: determine whether the message ID of the message matches the message ID of the message tag; and determine whether to fully consume the message based on the status responsive to a determination that the message ID of the message matches the message ID of the message tag.

Example 17. The apparatus of example 15, the status a binary indication, when executing the instructions, the processing caused to determine whether to fully consume the message based on the binary indication.

Example 18. The apparatus of example 17, the status comprising a binary indication of fraudulent or not fraudulent, the processing caused to determine whether to fully consume the message based the status indicating being not fraudulent.

Example 19. The apparatus of example 15, message tag comprising a probability field, the processing caused to determine whether to fully consume the message based on the probability field and the status.

Example 20. The apparatus of example 15, the communication bus a controller area network (CAN) bus, a FlexRay bus, a CAN FD bus, an automotive ethernet bus, or a local interconnected network (LIN) bus.

Example 21. A computer implemented method, comprising: receiving a message from a communication bus; receiving a message tag associated with the message; and determining whether to fully consume the message based on the message tag.

Example 22. The computer-implemented method of example 21, the message comprising a message ID field and the message tag comprising a message ID field, the method comprising: determining whether the message ID of the message matches the message ID of the message tag; and determining whether to fully consume the message based on a determination that the message ID of the message matches the message ID of the message tag.

Example 23. The computer-implemented method of example 21, the status a binary indication, the method comprising forwarding the message to ECU processing circuitry based on the binary indication.

Example 24. The computer-implemented method of example 23, the status comprising a binary indication of fraudulent or not fraudulent, the method comprising forwarding the message to ECU processing circuitry based on the status indicating being not fraudulent.

Example 25. The computer-implemented method of example 21, message tag comprising a probability field, the method comprising forwarding the message to ECU processing circuitry based on the probability field and the status.

Example 26. The computer-implemented method of example 21, the communication bus a controller area network (CAN) bus, a FlexRay bus, a CAN FD bus, an automotive ethernet bus, or a local interconnected network (LIN) bus.

Example 27. A computer-readable storage medium for an electronic control unit (ECU) in a vehicle, that stores instructions for execution by the ECU, the instructions to cause the ECU to: receive a message from an in-vehicle network; receive a message tag associated with the message; and determine whether to fully consume the message based on the message tag.

Example 28. The computer-readable storage medium of example 27, the message comprising a message ID field and the message tag comprising a message ID field, the instructions to cause the ECU to: determine whether the message ID of the message matches the message ID of the message tag; and determine whether to fully consume the message based on a determination that the message ID of the message matches the message ID of the message tag.

Example 29. The computer-readable storage medium of example 27, the status a binary indication, the instructions to cause the ECU to forward the message to ECU processing circuitry based on the binary indication.

Example 30. The computer-readable storage medium of example 29, the status comprising a binary indication of fraudulent or not fraudulent, the instructions to cause the ECU to forward the message to ECU processing circuitry based on the status indicating being not fraudulent.

Example 31. The computer-readable storage medium of example 27, message tag comprising a probability field, the instructions to cause the ECU to forward the message to ECU processing circuitry based on the probability field and the status.

Example 32. computer-readable storage medium of example 27, the communication bus a controller area network (CAN) bus, a FlexRay bus, a CAN FD bus, an automotive ethernet bus, or a local interconnected network (LIN) bus.

Example 33. An apparatus, comprising means arranged to implement the function of any one of examples 21 to 26.

What is claimed is:
1. An apparatus, comprising:
an interface to communicate information over a communication link;
processing circuitry communicatively coupled to the interface, the processing circuitry to:
receive a message from the interface, the message to include a message identifier and information generated by an electronic control unit (ECU);
receive a message tag for the message from the interface separate from the message, the message tag to include the message identifier and an indication of a message status generated by security tagging circuitry;
determine the message identifier for the message matches the message identifier in the message tag; and
determine whether to process the message based on the message status indicated by the message tag.

2. The apparatus of claim 1, wherein the message status is a binary indication of whether the message is authentic or not authentic.

3. The apparatus of claim 1, the processing circuitry to process the message when the message status of the message tag indicates the message is authentic.

4. The apparatus of claim 1, the processing circuitry to discard the message when the message status of the message tag indicates the message is not authentic.

5. The apparatus of claim 1, the processing circuitry to:
determine the message status of the message tag indicates the message is not authentic;
compare the information generated by the ECU to information stored in a database; and
determine whether to process the message based on results of the comparison.

6. The apparatus of claim 1, wherein the message tag further includes a probabilistic indication for the message status, the probabilistic indication to comprise a percentage amount of certainty that the message is authentic or not authentic.

7. The apparatus of claim 6, the processing circuitry to:
determine the message status of the message tag indicates the message is not authentic;
compare the probabilistic indication of the message tag to a threshold value; and
determine whether to process the message based on results of the comparison.

8. The apparatus of claim 1, the interface to receive the message and the message tag over the communication link, wherein the communication link is a communication bus for an in-vehicle network (IVN) or a sideband bus of the IVN.

9. The apparatus of claim 1, wherein the interface and the processing circuitry are part of a single chip architecture.

10. A system, comprising:
a single microchip to comprise an interface and circuitry, the interface to communicate information, and the circuitry to:
receive a message from the interface, the message to include a message identifier and information generated by an electronic control unit (ECU);
receive a message tag for the message from the interface separate from the message, the message tag to include the message identifier and an indication of a message status generated by security tagging circuitry;
determine the message identifier for the message matches the message identifier in the message tag; and
determine whether to process the message based on the message status indicated by the message tag.

11. The system of claim 10, wherein the message status is a binary indication of whether the message is authentic or not authentic.

12. The system of claim 10, the circuitry to:
process the message when the message status of the message tag indicates the message is authentic; or
discard the message when the message status of the message tag indicates the message is not authentic.

13. The system of claim 10, the circuitry to:
determine the message status of the message tag indicates the message is not authentic;

compare the information generated by the ECU to information stored in a database; and determine whether to process the message based on results of the comparison.

14. The system of claim 10, wherein the message tag further includes a probabilistic indication for the message status, the probabilistic indication to comprise a percentage amount of certainty that the message is authentic or not authentic.

15. The system of claim 14, the circuitry to:

determine the message status of the message tag indicates the message is not authentic;

compare the probabilistic indication of the message tag to a threshold value; and determine whether to process the message based on results of the comparison.

16. The system of claim 10, comprising a communication bus communicatively coupled to the interface, the communication bus comprising part of an in-vehicle network (IVN).

17. An apparatus, comprising:

an interface to communicate information over a communication link;

security tagging circuitry coupled to the interface, the security tagging circuitry to:

receive a message from the interface, the message to include a message identifier and information generated by a first electronic control unit (ECU);

perform a security analysis of the message;

generate a message tag for the message, the message tag to include the message identifier and an indication of a message status for the message; and send the message tag separate from the message to a second ECU via the interface.

18. The apparatus of claim 17, wherein the message status is a binary indication of whether the message is authentic or not authentic.

19. The apparatus of claim 17, wherein the message tag further includes a probabilistic indication for the message status, the probabilistic indication to comprise a percentage amount of certainty that the message is authentic or not authentic.

20. The apparatus of claim 17, the interface to send the message tag to the second ECU over the communication link, wherein the communication link is a communication bus of an in-vehicle network (IVN) or a sideband bus of the IVN.

* * * * *